(12) United States Patent
Chen

(10) Patent No.: US 12,465,809 B1
(45) Date of Patent: Nov. 11, 2025

(54) TREADMILL WITH ADJUSTABLE ARMREST HEIGHT

(71) Applicant: Zhangjian Chen, Jiujiang (CN)

(72) Inventor: Zhangjian Chen, Jiujiang (CN)

( * ) Notice: Subject to any disclaimer, the term of this patent is extended or adjusted under 35 U.S.C. 154(b) by 0 days.

(21) Appl. No.: 19/265,105

(22) Filed: Jul. 10, 2025

(30) Foreign Application Priority Data

Jun. 18, 2025 (CN) .......................... 202521246171.2

(51) Int. Cl.
*A63B 22/02* (2006.01)
(52) U.S. Cl.
CPC .................................. *A63B 22/02* (2013.01)
(58) Field of Classification Search
CPC . A63B 22/02; A63B 2225/093; F16B 7/1418; F16B 7/1454
See application file for complete search history.

(56) References Cited

U.S. PATENT DOCUMENTS

| | | | | |
|---|---|---|---|---|
| 6,557,878 B2* | 5/2003 | Chen | ...................... | B62K 19/36 280/226.1 |
| 7,195,377 B2* | 3/2007 | Tsai | ..................... | F16M 11/245 362/427 |
| 10,051,930 B2* | 8/2018 | Heim | ........................ | A45B 9/00 |
| 2002/0103057 A1* | 8/2002 | Watterson | .......... | A63B 22/0023 482/54 |
| 2011/0070021 A1* | 3/2011 | Huang | .................. | F16B 7/1418 403/374.5 |
| 2012/0172153 A1* | 7/2012 | Newman | ............ | A63B 69/0075 473/417 |
| 2020/0215380 A1* | 7/2020 | Xing | .................... | A63B 22/025 |
| 2022/0290707 A1* | 9/2022 | Huang | .................. | F16B 7/1454 |
| 2024/0200716 A1* | 6/2024 | Li | .......................... | F16M 11/32 |

FOREIGN PATENT DOCUMENTS

| | | | | |
|---|---|---|---|---|
| CN | 113926141 A | * | 1/2022 | ......... A63B 22/0605 |
| CN | 120268021 A | * | 7/2025 | |

* cited by examiner

Primary Examiner — Joshua T Kennedy
(74) Attorney, Agent, or Firm — Birchwood IP

(57) ABSTRACT

A treadmill with adjustable armrest height is provided. Which includes a rack, a running platform is provided on the rack; vertical pipe components symmetrically arranged on two sides of a front end of the rack, the vertical pipe components include a first pipe and two second pipes. Tops of the second pipes are extended to an upper side of an opening the first pipe and are provided with a handrail; a console connected between the two second pipes; a height locking mechanism including a locking sleeve and a seat pipe clamp, the locking sleeve is made of flexible material and is sleeved on outer walls of the second pipes; when the seat pipe clamps the locking sleeve, the locking sleeve undergoes a radial elastic deformation and clamps the outer walls of the second pipes, achieving a mechanical locking of a lifting stroke of the second pipes.

9 Claims, 9 Drawing Sheets

TREADMILL WITH ADJUSTABLE ARMREST HEIGHT

CROSS-REFERENCE TO RELATED APPLICATIONS

This application claims priority to Chinese Patent Application No. 202521246171.2, filed on Jun. 18, 2025, which is hereby incorporated by reference in its entirety.

TECHNICAL FIELD

The present disclosure relates to the field of treadmill technologies, and in particular, to a treadmill with adjustable armrest height.

BACKGROUND

The technical features of the current mainstream design for treadmills can be summarized as follows: the console and armrests adopt an integrated fixing design, and the armrests are rigidly connected to the treadmill rack through left and right vertical pipes. Although this structure has advantages of simple design and low manufacturing cost, which can meet the basic movement needs, it has significant ergonomic defects: firstly, the fixed height design of the console makes the window operation interface unable to adapt to users of different heights (especially for people below 160 cm and above 185 cm), which results in problems such as visual pitch angle discomfort and inconvenient operation during use; secondly, the height of the armrest lacks adjustability. When users stretch after running (such as pressing their legs), the fixed height support structure is difficult to meet the differentiated needs of the 150-190 cm height range, which results in limited limb extension.

SUMMARY

To address the shortcomings of existing technology, a treadmill with adjustable armrest height is provided.

The present disclosure adopts the following technical solution for implementation: a treadmill with adjustable armrest height, including:

a rack, which is provided with a running platform;
vertical pipe components that are symmetrically provided on two sides of a front end of the rack, the vertical pipe components include a first pipe fixed to the rack and two second pipe flexibly inserted into the first pipe; tops of the two second pipes are extended to an upper side of an opening of the first pipe and are provided with a handrail;
a console connected between the two second pipes;
a height locking mechanism, which includes a locking sleeve located at a top opening of the first pipe and a seat pipe clamp wrapped around an outer side of the locking sleeve, where the locking sleeve is made of flexible material and is sleeved on outer walls of the two second pipes; when the seat pipe clamp clamps the locking sleeve, the locking sleeve undergoes a radial elastic deformation and clamps the outer walls of the two second pipe so as to achieve a mechanical locking of a lifting stroke of the two second pipes.

During use, a user can open the seat pipe clamp to release the locking sleeve. At this time, the second pipes can be lifted and lowered. When they reach a suitable height, the seat pipe clamp can be locked to clamp the locking sleeve.

Where, the seat clamp adopts any existing seat clamp that can clamp or loosen pipe fittings.

Where the flexible material of the locking sleeve can be rubber, plastic or other flexible materials that can undergo an elastic deformation.

This scheme achieves mechanical locking of the lifting stroke of the second pipes by clamping or loosening the locking sleeve with the seat pipe clamp, thereby adjusting the height of the handrail and achieving stepless locking of the lifting stroke of the second pipes. And the locking sleeve in this scheme is located between the seat pipe clamp and the second pipes. The locking sleeve is made of flexible material, which converts a linear clamping force of the seat pipe clamp into uniformly distributed radial compressive stress, rendering the outer walls of the second pipes more evenly stressed in a circumferential direction. And the locking sleeve is located between the second pipes and the seat pipe clamp, which can effectively avoid micro motion wear between the second pipes and the locking sleeve, and can extend the service life of the second pipes.

In some embodiments of the present disclosure, the locking sleeve includes a radial clamping section and an axial extension section; a circular limit flange extending radially outward is provided between the radial clamping section and the axial extension section; a bottom end of the circular limit flange is supported on an opening end face of the first pipe, and the seat pipe clamp is provided on an outer side of the radial clamping section and supported on a top end of the circular limit flange;

the axial extension section is extended into the first pipe, and an outer wall of the axial extension section abuts against an inner wall of the first pipe, and an inner wall of the axial extension section abuts against the outer walls of the two second pipes.

The annular limit flange can limit a position of the locking sleeve on the first pipe, and also limit a position of the seat pipe clamp clamped on the locking sleeve. It extends into the first pipe through the axial extension section, and the axial extension section is in contact with the first pipe and the second pipes, thereby increasing the stability of the second pipes.

In some embodiments of the present disclosure, the locking sleeve is provided with a plurality of spacing seams that are axially extended, and the spacing seams penetrate inner and outer walls of the locking sleeve, and penetrate a top of the locking sleeve, and divide the locking sleeve into a plurality of elastically deformable flaps.

By providing the spacing seams that pass through the top of the locking sleeve, the locking sleeve can be divided into a plurality of elastic deformation flaps. Thus, it is easier for the locking sleeve to deform under an action of the seat pipe clamp so as to facilitate the clamping of the seat pipe, all deformation flaps simultaneously contract radially inward to clamp the second pipes, and also to facilitate a release of the seat pipe clamp, all deformation flaps simultaneously release radially outward to release the second pipes.

In some embodiments of the present disclosure, the plurality of spacing seams are evenly distributed along a circumferential direction of the locking sleeve on the locking sleeve.

Uniformly spaced spacing gaps can better distribute radial compressive stress uniformly.

In some embodiments of the present disclosure, the spacing seams include an expansion section and a straight-line section extending along an axial direction of the vertical pipe components, the straight-line section passes through the radial clamping section and a part of the axial extension section; one end of the straight-line section passes through a top of the radial clamping section, and the expansion section is located at the other end of the straight-line section and is located at the axial extension section; a width of the expansion section is greater than a width of the straight-line section.

The spacing seams passes through the radial clamping section and the axial extension section, and a wider expansion section is provided at one end of the straight-line section, which further facilitates the elastic deformation of the entire locking sleeve and enables better clamping or loosening of the second pipes.

In some embodiments of the present disclosure, at least one buckle is provided on an outer wall of a bottom of the axial extension section, and a buckle hole engaging with the buckle is provided on the first pipe.

By connecting the buckle with the buckle hole, the entire locking sleeve is fixed on the first pipe, and the lifting and sliding of the second pipes will not drive the locking sleeve to move, rendering it more stable.

In some embodiments of the present disclosure, the axial extension section is provided with deformation seams that are extended axially on two sides of the buckle and penetrate a bottom end of the axial extension section; the deformation seams divide an area where the buckle is located into independent elastic deformation pieces, and thicknesses of the deformation pieces are smaller than a thickness of the axial extension section.

The above settings can facilitate a deformation of the deformation pieces. Thus, it is easier for the buckle to be connected to the buckle hole and for the locking sleeve to be provided on the first pipe.

In some embodiments of the present disclosure, an inner wall of the locking sleeve includes a ribbed area with ribs and a smooth area without ribs, a maximum thickness of the ribbed area is the same as that of the smooth area, the ribbed area is provided on a lower side of the smooth area, and the straight-line section of the spacing seams passes through the smooth area.

The smooth area is located at an upper end of the rib area, and the smooth area is a main deformation area. The inner wall of the smooth area can have more comprehensive contact with the second pipes, so that when clamping the second pipes with the seat pipe clamp, the radial clamping force on the second pipes can be more uniform. The rib area is located below, and the axially extending rib forms a mechanical conduction path, which directionally converts the radial contraction deformation of the locking sleeve into an axial compressive stress of the rib, thereby avoiding an attenuation of a clamping force caused by a circumferential stress diffusion that is prone to occur in traditional smooth contact surfaces. Therefore, although the rib area is far away from the seat pipe clamp, it also has a weak clamping effect and anti-slip performance on the second pipes. Besides that, the smooth and ribbed areas can facilitate the locking of the sleeve during production.

In some embodiments of the present disclosure, the seat pipe clamp includes a clamp ring with an opening, the clamp ring is C-shaped, and connection ears integrated with the clamp ring are provided at an opening of the clamp ring; a screw is provided between the connection cars, and one end of the screw is threaded with a nut, and the other end of the screw is rotatably connected with an eccentric handle; the locking sleeve is provided with a thickened portion at an opening of the corresponding clamping ring, and the thickened portion abuts against a connection between the clamping ring and the connection cars.

After the eccentric handle is rotated, a distance between the two connection ears will decrease, which results in a reduction in an inner diameter of the entire clamping ring, thereby clamping the second pipe. The area between the connection ears and the clamping ring is the area with a highest clamping force. Therefore, in order to avoid damage to the second pipes, the thickened part is provided on the locking sleeve to protect the second pipes.

In some embodiments of the present disclosure, a bottom surface of the axial extension section is inclined.

The inclined setting can facilitate the insertion of the locking sleeve into the first pipe.

Compared with existing technologies, the beneficial effect of the present disclosure is that it achieves mechanical locking of the lifting stroke of the second pipes by clamping or loosening the locking sleeve of the seat pipe clamp, thereby adjusting the height of the handrail and achieving stepless locking of the lifting stroke of the second pipes. And the locking sleeve in this scheme is located between the seat pipe clamp and the second pipes. The locking sleeve is made of flexible material, which converts the linear clamping force of the seat pipe clamp into uniformly distributed radial compressive stress, rendering the outer walls of the second pipes more evenly stressed in the circumferential direction. And the locking sleeve is located between the second pipes and the seat pipe clamp, which can effectively avoid micro motion wear between the second pipes and the locking sleeve, and can extend the service life of the second pipes and the first pipe.

Numeral reference: 1—rack; 2—running platform; 3—vertical pipe component; 31—first pipe; 311—buckle hole; 32—second pipe; 4—handrail; 41—crossbeam; 42—console; 5—seat pipe clamp; 51—clamp ring; 52—connection ear; 53—screw; 54—eccentric handle; 55—nut; 6—locking sleeve; 61—radial clamping section; 611—thickened portion; 62—circular limit flange; 63—axial extension section; 71—deformation seam; 72—deformation piece; 73—buckle; 8—spacing seam; 81—straight-line section; 82—expansion section; 91—smooth area; 92—ribbed area; 10—deformable flap.

DESCRIPTION OF EMBODIMENTS

Below is a further description of the present disclosure based on the accompanying drawings and specific embodiments.

Figure 1:
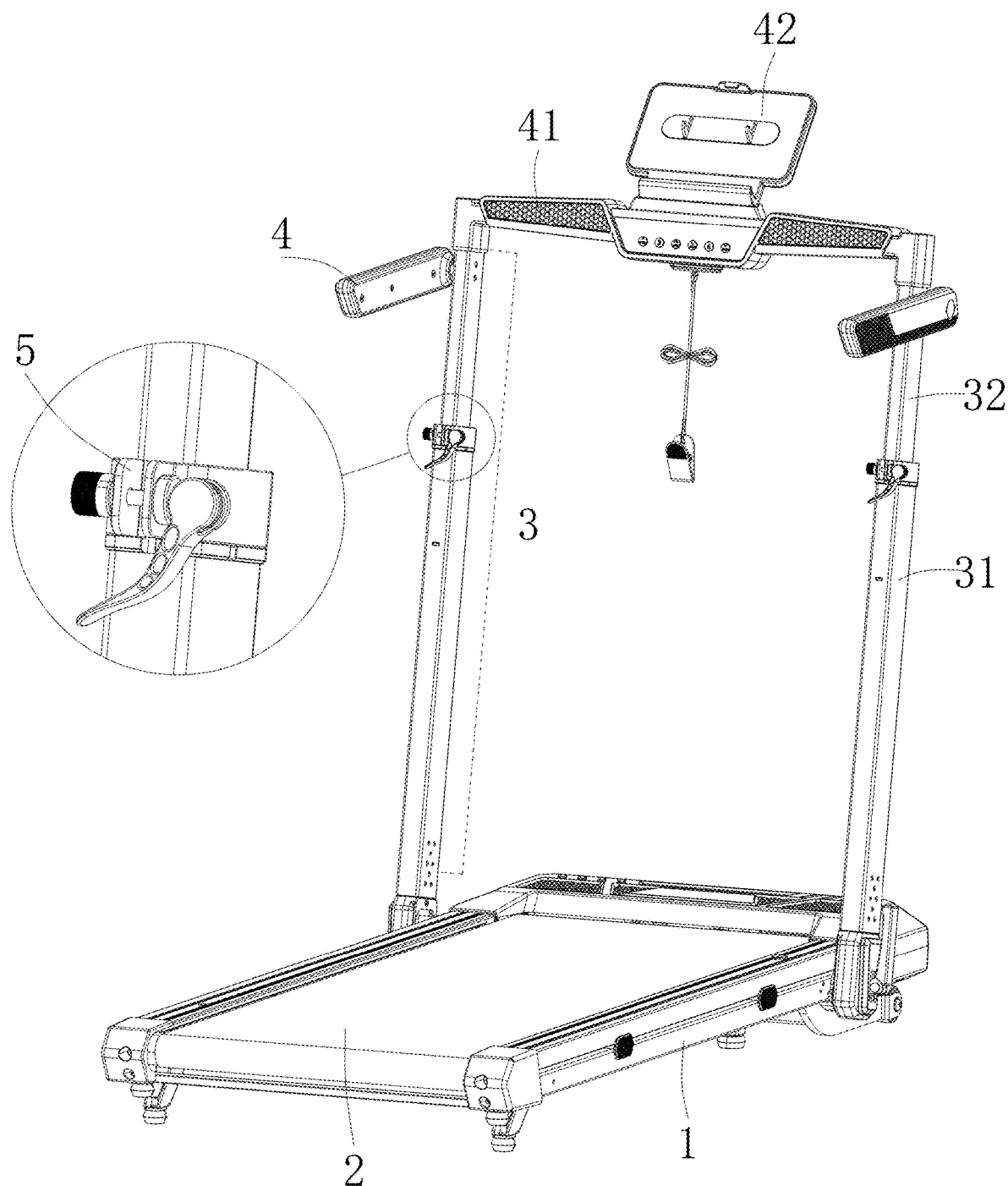
FIG. 1 is a schematic structural diagram of the present disclosure.
Figure 2:
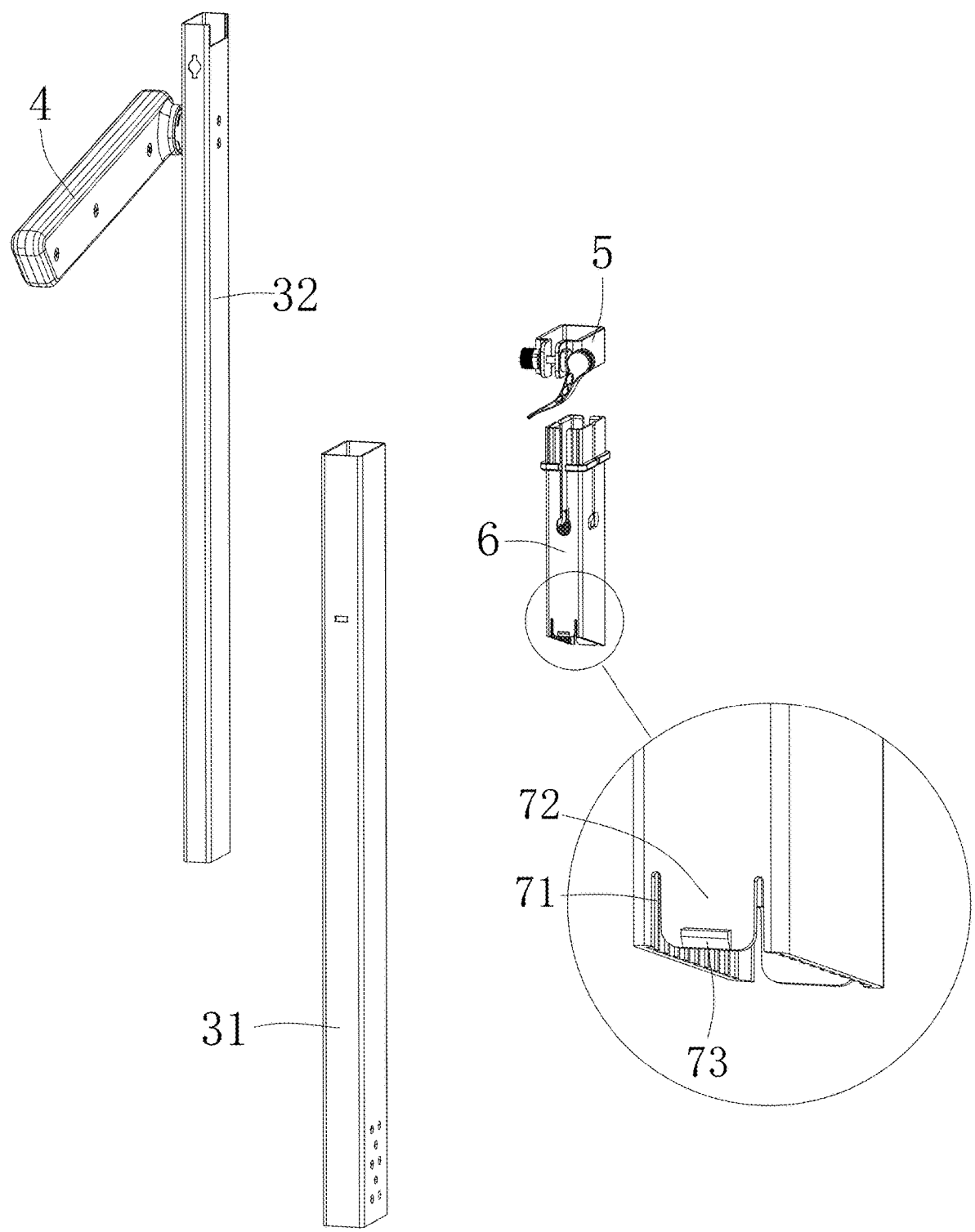
FIG. 2 is a schematic diagram of an explosion structure of a vertical pipe component.
Figure 3:
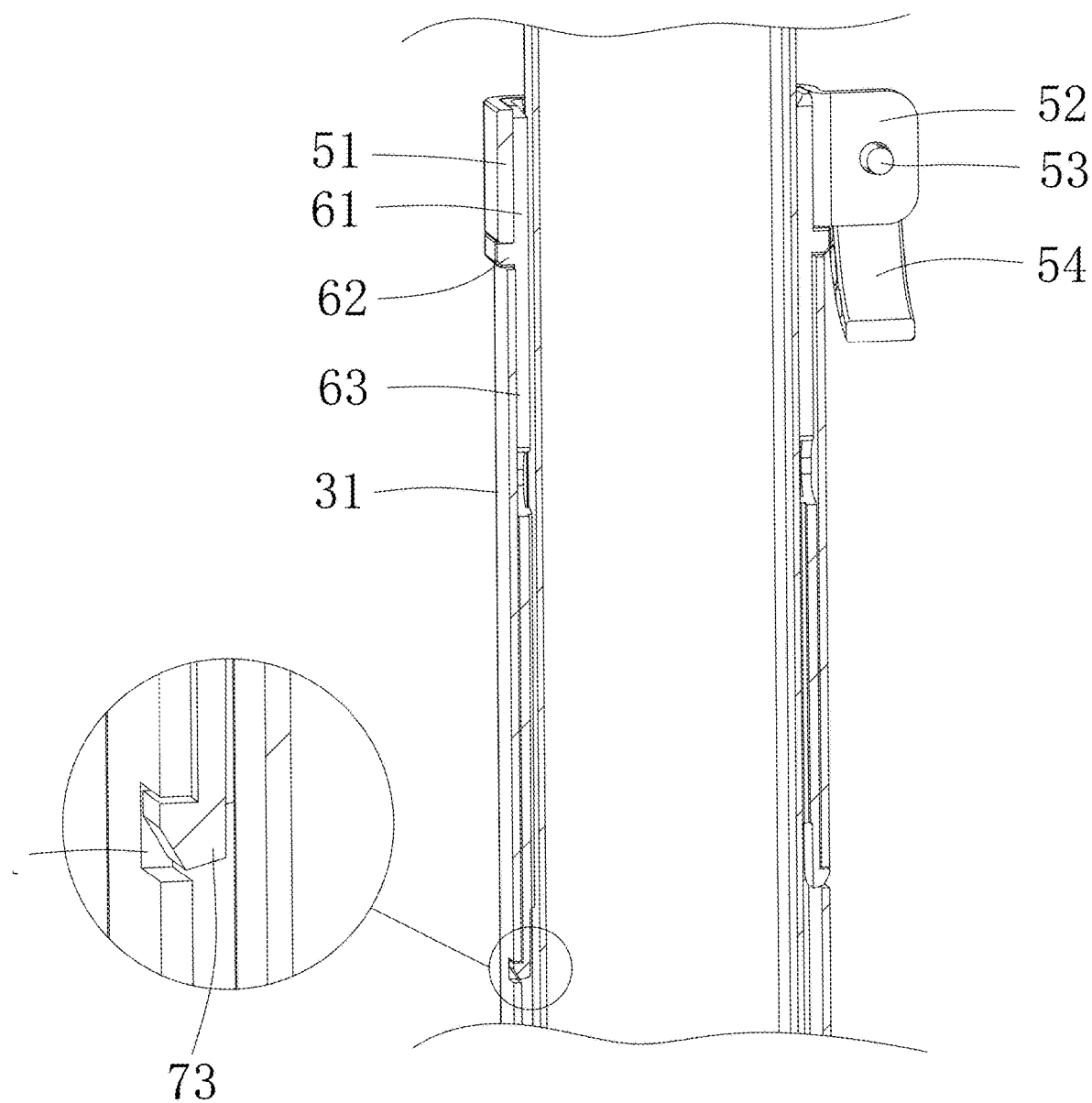
FIG. 3 is a sectional view of the vertical pipe component.
Figure 4:
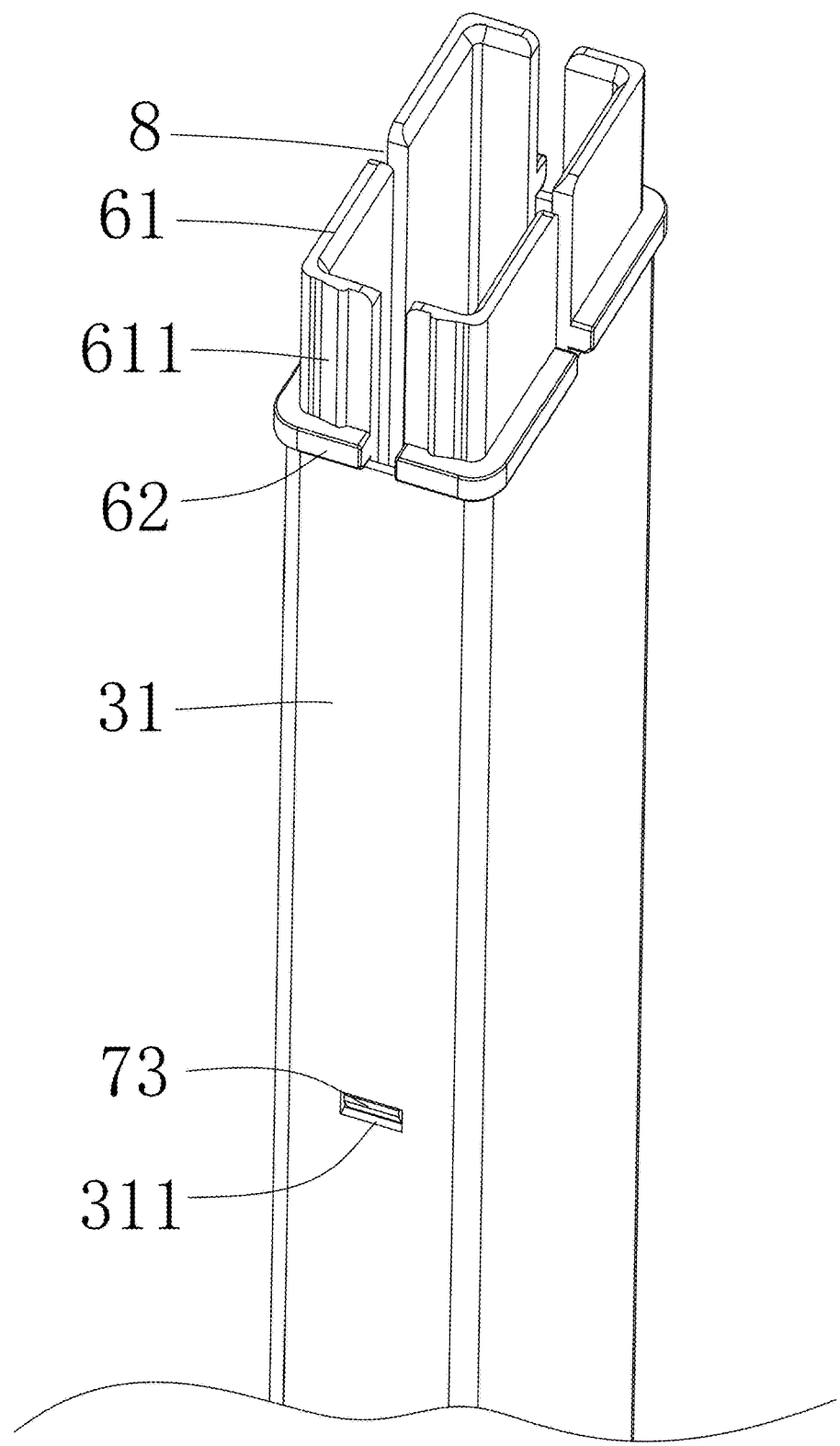
FIG. 4 is a schematic structural diagram of a locking sleeve and a first pipe.

As shown in FIGS. 1 and 2, an embodiment discloses a treadmill with adjustable armrest height, including a rack 1, a running platform 2 provided on the rack 1, and vertical pipe components 3 provided on two sides of a front end of the rack. The vertical pipe components 3 include a first pipe 31 fixed to the rack 1 and two second pipes 32. Cross-sectional shapes of the first pipe 31 and the second pipes 32 are rectangular, and both of the first pipe 31 and the second pipes 32 are hollow. The shapes of the second pipes 32 are adapted to that of the first pipe 31, and sizes of the second pipes 32 are smaller than that of the first pipe 31, so that the second pipes 32 can be flexibly inserted into the first pipe 31. The first pipe 31 is extended from tops of the second pipes 32, and a handrail 4 is fixed at a top of the second pipes 32. A crossbeam 41 is provided between the two second pipes 32, and a console 42 is provided on the crossbeam 41. The console 42 is any existing console that can control the speed and slope of a treadmill.

As shown in FIGS. 2 to 9, a height locking mechanism is provided at an opening end of the first pipe 31. The height locking mechanism includes a locking sleeve 6 located at a top opening of the first pipe 31 and a seat pipe clamp 5 wrapped around an outside of the locking sleeve 6. A cross-sectional shape of the locking sleeve 6 is rectangular and matches the shape of the first pipe 31 and the second pipe 32. The locking sleeve 6 is made of flexible materials such as rubber or plastic and is fitted onto an outer wall of the second pipes 32.

The locking sleeve 6 includes a radial clamping section 61 and an axial extension section 63 in sequence from bottom to top. A circular limit flange 62 is extended radially outward is provided between the radial clamping section 61 and an axial extension section 63. A size of the circular limit flange 62 is larger than that of the first pipe 31, so that a bottom end of the circular limit flange 62 can be supported on the opening end face of the first pipe 31. The seat pipe clamp 5 is sleeved on an outer side of the radial clamping section 61 and supported at a top of the circular limit flange 62. An axial extension section 63 is extended into the first pipe 31, and an outer wall of the axial extension section 63 abuts against the inner wall of the first pipe 31. An inner wall of the axial extension section 63 abuts against the outer walls of the second pipes 32.

A bottom surface of the axial extension section 63 is inclined, a rear side thereof is lower than a front side, rendering it easier for the locking sleeve 6 to be inserted into the first pipe 31.

There are two buckles 73 on an outer wall of a bottom of the axial extension section 63, the two buckles 73 are located on front and rear sides of the axial extension section 63. There are buckle holes 311 on front and rear walls of the first pipe 31 that are engaged with the buckles 73. There are deformation seams 71 that are extended axially two sides of the buckle 73 and penetrate a bottom end of the axial extension section. The deformation seams 71 divide an area where the buckle 73 is located into independent elastic deformation pieces 72, and thicknesses of the deformation pieces 72 are smaller than that of the axial extension section 63 itself.

Figure 7:
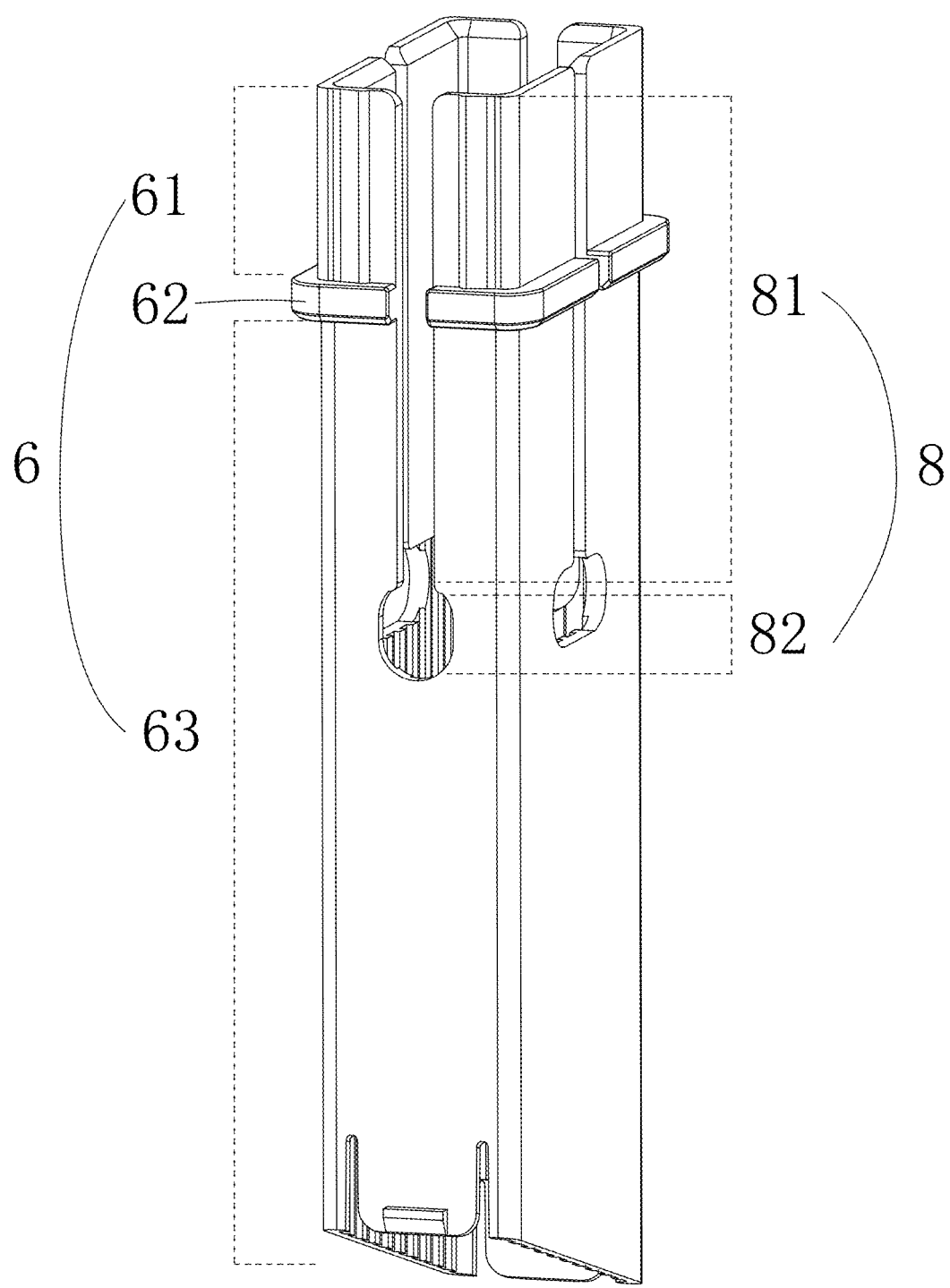
FIG. 7 is a schematic structural diagram of the locking sleeve.
Figure 8:
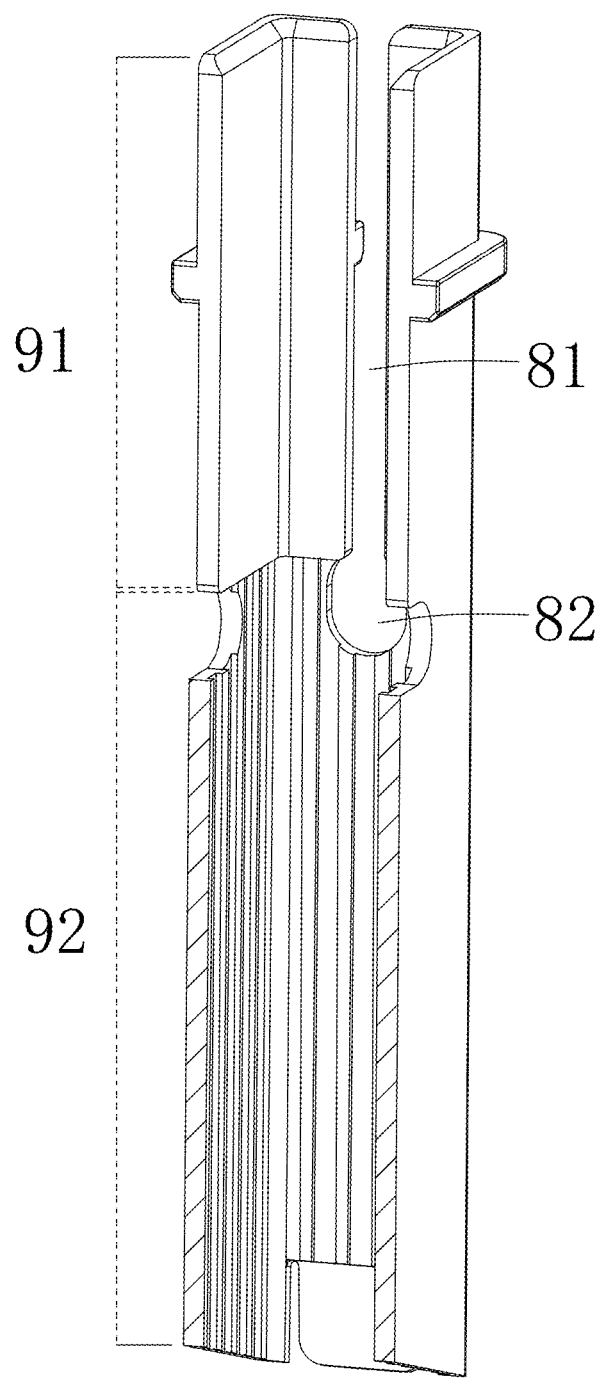
FIG. 8 is a sectional view of the locking sleeve.
Figure 9:
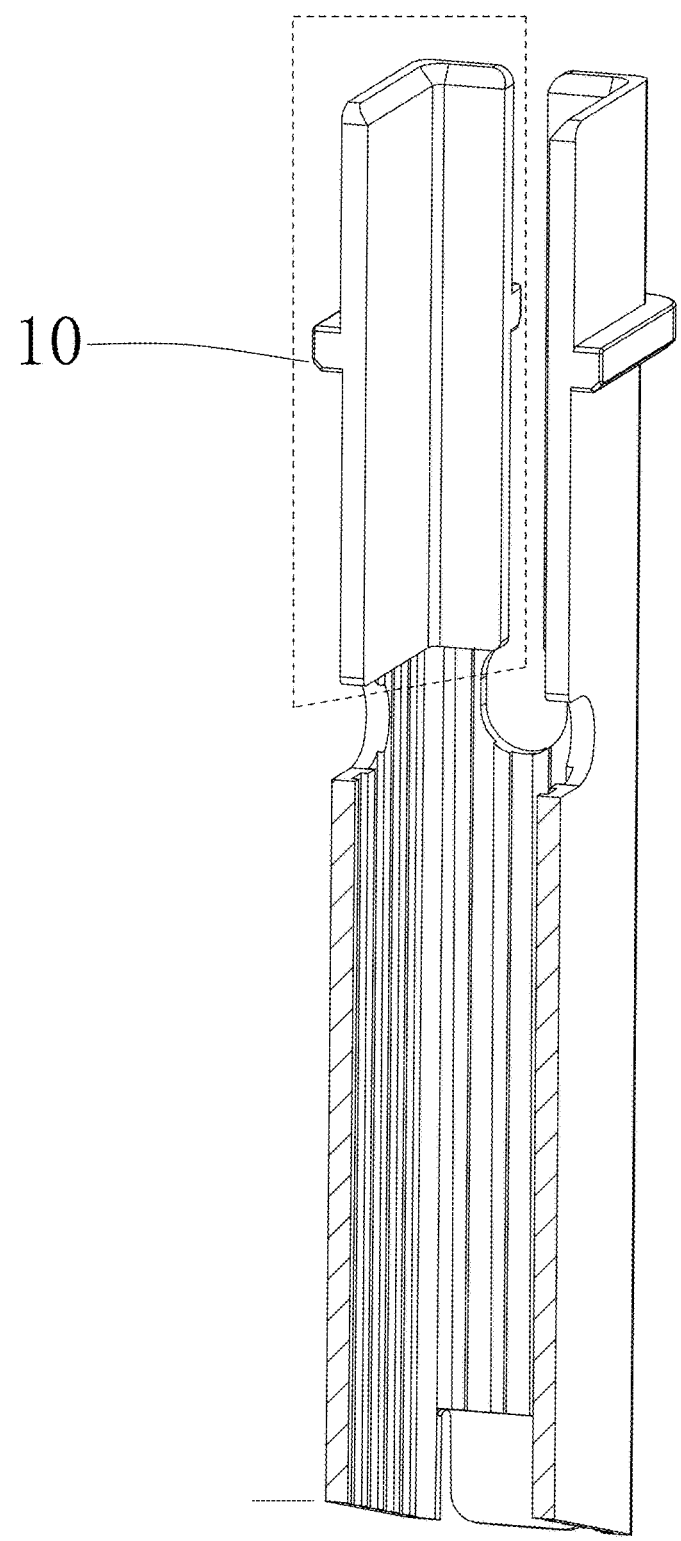
FIG. 9 is a schematic structural diagram of a deformation flap.

As shown in FIGS. 7, 8, and 9, four side walls of the locking sleeve 6 are provided with spacing seams 8 that are axially extended, which are evenly spaced along a circumferential direction of the locking sleeve 6. The spacing seams 8 run through inner and outer walls of the locking sleeve 6 and a top of the locking sleeve 6. The spacing seams 8 divide an upper part of the locking sleeve 6 into four elastic deformable flaps 10.

The spacing seams 8 include an expansion section 82 and a straight-line section 81 extending along an axial direction of the vertical pipe components 3. The straight-line section 81 passes through the radial clamping section 61 and an upper end of the axial extension section 63, and an upper end of the straight-line section 81 passes through a top of the radial clamping section 61. The expansion section 82 is located at a lower end of the straight-line section 81 and in an area of the axial extension section 63; an expansion section 82 is circular or elliptical in shape, and its width is greater than that of the straight-line section 81.

As shown in FIG. 8, an inner wall of the locking sleeve 6 includes a ribbed area 92 with ribs and a smooth area 91 without ribs. The ribs in the ribbed area 92 are evenly spaced along a circumferential direction. A maximum thickness of the ribbed area 92 is the same as that of the smooth area 91. The ribbed area 92 is located on a lower side of the smooth area 91, and the straight-line section 81 of the spacing seams 8 passes through the smooth area 91. The expansion section 82 of the spacing seam 8 is located in the ribbed area 92.

Figure 5:
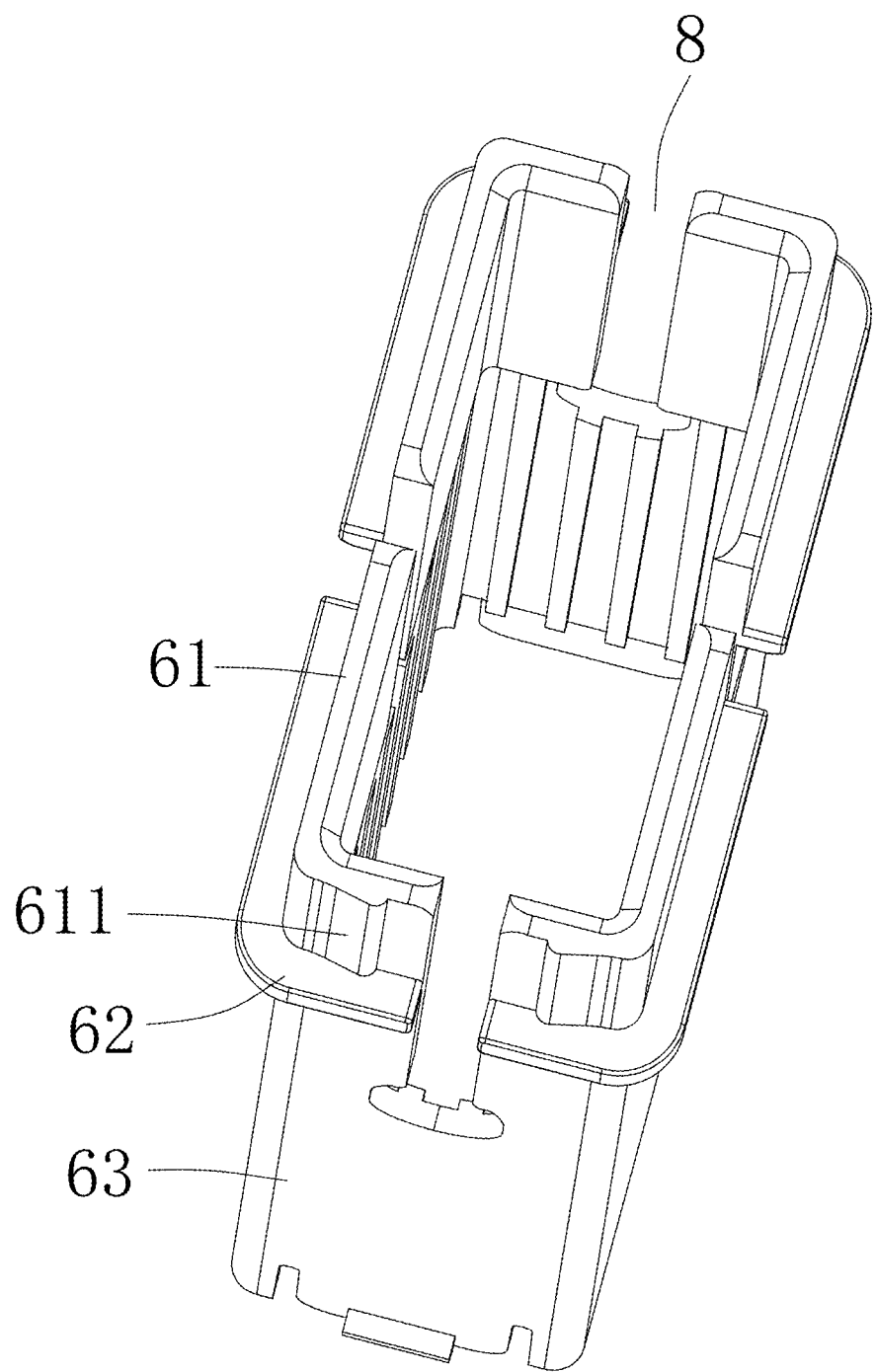
FIG. 5 is an enlarged view of the locking sleeve and first pipe.
Figure 6:
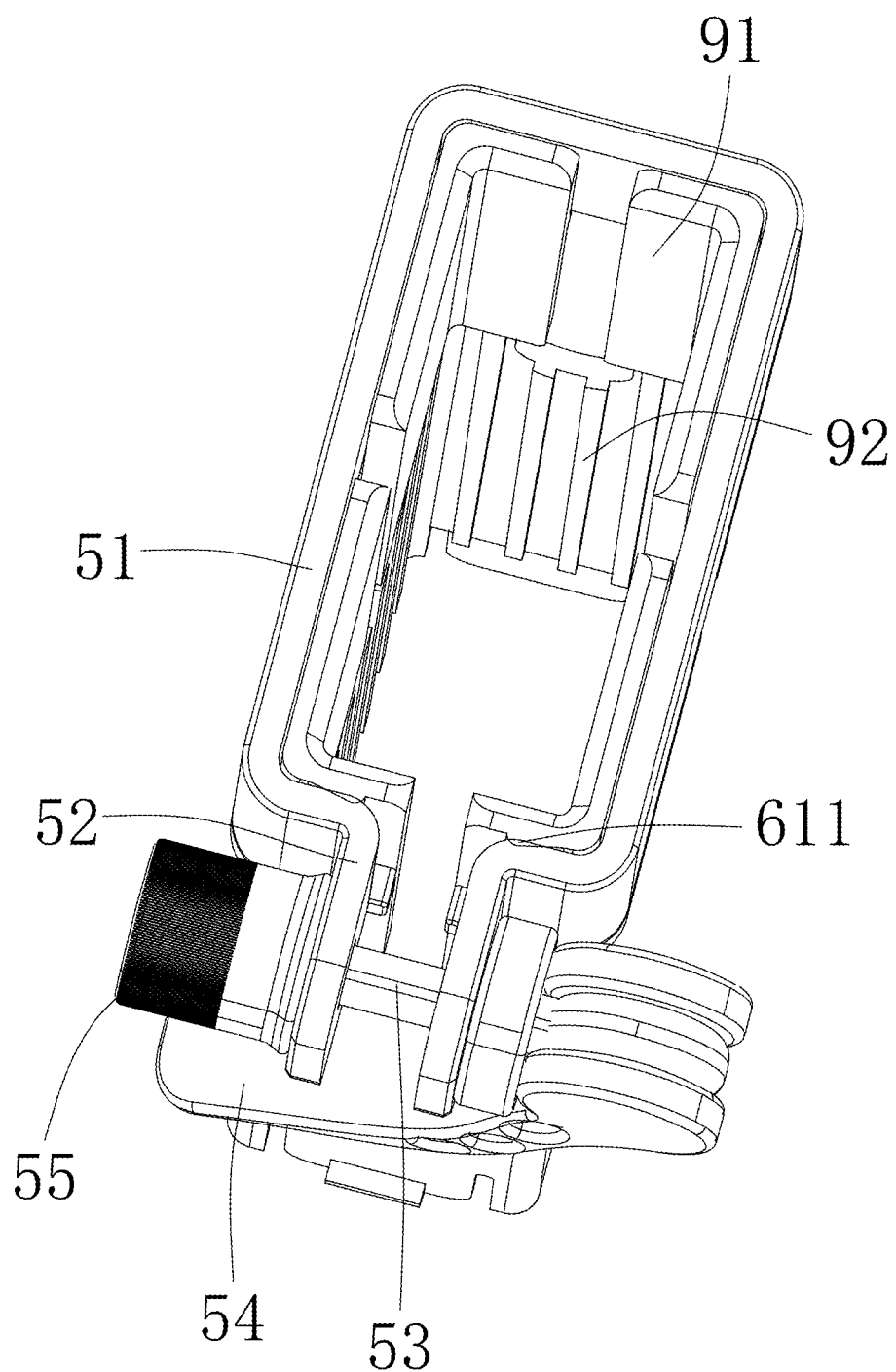
FIG. 6 is a schematic structural diagram of the locking sleeve with a seat pipe clamp in FIG. 5.

As shown in FIGS. 5 and 6, the seat pipe clamp 5 includes a clamp ring 51 with an opening, and the clamp ring 51 is C-shaped. A cross-section of the clamp ring 51 is adapted to the vertical pipe components. An opening of the clamp ring 51 is provided with connection ears 52 that are integrally formed with the clamp ring 51. The connection ears 52 are extended outward, and a screw 53 passes through between the two connection ears 52. One end of the screw 53 is threaded with a nut 55, and the other end of the screw 53 is rotatably connected to an eccentric handle 54; a radial clamping section 61 of the locking sleeve 6 is provided with a thickened portion 611 at an opening of the clamp ring 51, and the thickened portion 611 abuts against a connection between the clamp ring 51 and the connection ears 52.

What is claimed is:

1. A treadmill with adjustable armrest height, comprising:
   a rack, which is provided with a running platform;
   vertical pipe components that are symmetrically provided on two sides of a front end of the rack, the vertical pipe components comprise two first pipes fixed to the rack and two second pipes flexibly inserted into the two first pipes; tops of the two second pipes are extended to upper sides of openings of the two first pipes and are provided with a handrail;
   a console connected between the two second pipes;
   two height locking mechanisms, which comprise two locking sleeves located at top openings of the two first pipes and a seat pipe clamp wrapped around an outer side of the two locking sleeves, wherein the two locking sleeves are made of flexible material and are sleeved on outer walls of the two second pipes; when the seat pipe clamp clamps the two locking sleeves, the two locking sleeves undergo a radial elastic deformation and clamp the outer walls of the two second pipe so as to achieve a mechanical locking of a lifting stroke of the two second pipes;
   wherein the two locking sleeves comprise a radial clamping section and an axial extension section;
   wherein at least one buckle is provided on an outer wall of a bottom of the axial extension section, and a buckle hole engaging with the at least one buckle is provided on the two first pipes.

2. The treadmill with adjustable armrest height according to claim 1, wherein
   a circumferential limit flange extending radially outward is provided between the radial clamping section and the axial extension section;
   a bottom end of the circumferential limit flange is supported on an opening end face of the two first pipes, and the seat pipe clamp is provided on an outer side of the radial clamping section and supported on a top end of the circumferential limit flange;

the axial extension section is extended into the two first pipes, and an outer wall of the axial extension section abuts against an inner wall of the two first pipes, and an inner wall of the axial extension section abuts against the outer walls of the two second pipes.

3. The treadmill with adjustable armrest height according to claim 2, wherein the two locking sleeves are provided with a plurality of spacing seams that are axially extended, and the spacing seams penetrate inner and outer walls of the two locking sleeves, penetrate a top of the two locking sleeves, and divide the two locking sleeves into a plurality of elastically deformable flaps.

4. The treadmill with adjustable armrest height according to claim 3, wherein the plurality of spacing seams are evenly distributed along circumferential directions of the two locking sleeves on the two locking sleeves.

5. The treadmill with adjustable armrest height according to claim 3, wherein the spacing seams comprise an expansion section and a straight-line section extending along an axial direction of the vertical pipe components, the straight-line section passes through the radial clamping section and a part of the axial extension section;

one end of the straight-line section passes through a top of the radial clamping section, and the expansion section is located at the other end of the straight-line section and is located at the axial extension section;

a width of the expansion section is greater than a width of the straight-line section.

6. The treadmill with adjustable armrest height according to claim 5, wherein an inner wall of the two locking sleeves comprises a ribbed area with ribs and a smooth area without ribs, a maximum thickness of the ribbed area is the same as that of the smooth area, the ribbed area is provided on a lower side of the smooth area, and the straight-line section of the spacing seams passes through the smooth area.

7. The treadmill with adjustable armrest height according to claim 2, wherein a bottom surface of the axial extension section is inclined.

8. The treadmill with adjustable armrest height according to claim 1, wherein the axial extension section is provided with deformation seams that are extended axially on two sides of the at least one buckle and penetrate a bottom end of the axial extension section;

the deformation seams divide an area where the at least one buckle is located into independent elastic deformation pieces, and thicknesses of the deformation pieces are smaller than a thickness of the axial extension section.

9. The treadmill with adjustable armrest height according to claim 1, wherein the seat pipe clamp comprises a clamp ring with an opening, the clamp ring is C-shaped, and connection ears integrated with the clamp ring are provided at an opening of the clamp ring;

a screw is provided between the connection ears, and one end of the screw is threaded with a nut, and the other end of the screw is rotatably connected with an eccentric handle;

the two locking sleeves are provided with a thickened portion at an opening of the corresponding clamp ring, and the thickened portion abuts against a connection between the clamp ring and the two connection ears.

* * * * *